United States Patent
Zhou

(10) Patent No.: US 9,594,208 B2
(45) Date of Patent: Mar. 14, 2017

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 75 days.

(21) Appl. No.: 14/431,000

(22) PCT Filed: Jan. 16, 2015

(86) PCT No.: PCT/CN2015/070884
§ 371 (c)(1),
(2) Date: Mar. 25, 2015

(87) PCT Pub. No.: WO2016/101370
PCT Pub. Date: Jun. 30, 2016

(65) Prior Publication Data
US 2016/0187567 A1      Jun. 30, 2016

(30) Foreign Application Priority Data

Dec. 24, 2014   (CN) .......................... 2014 1 0817836

(51) Int. Cl.
G02F 1/1333   (2006.01)
G02F 1/1335   (2006.01)
F21V 8/00     (2006.01)

(52) U.S. Cl.
CPC .......... *G02B 6/0085* (2013.01); *G02B 6/005* (2013.01); *G02B 6/0073* (2013.01); *G02B 6/0091* (2013.01); *G02F 1/133528* (2013.01); *G02F 1/133615* (2013.01); *G02F 2001/133302* (2013.01); *G02F 2001/133628* (2013.01)

(58) Field of Classification Search
CPC ............... G02F 1/133615; G02F 2001/133628
See application file for complete search history.

(56) References Cited

U.S. PATENT DOCUMENTS

| 2008/0129927 A1* | 6/2008 | Hamada | G02B 6/0036 349/65 |
| 2011/0025942 A1* | 2/2011 | Lee | G02F 1/133615 349/58 |
| 2014/0240639 A1* | 8/2014 | Jung | G02F 1/133308 349/60 |

* cited by examiner

Primary Examiner — Wen-Ying P Chen
(74) Attorney, Agent, or Firm — Andrew C. Cheng

(57) ABSTRACT

A backlight module includes a mold frame, a light guide plate, a light bar light source, and an optic film. The light guide plate, the light source, and the optic film are disposed in the mold frame. The light source is arranged between the light guide plate and the mold frame. The optic film and the light guide plate are stacked on each other. The backlight module includes a heat dissipation frame that includes first, second, and third heat dissipation walls. The third heat dissipation wall is opposite to the first heat dissipation wall and the second heat dissipation wall is connected to the first and third heat dissipation walls. An end of the mold frame at which the light source is arranged is received between the first and third heat dissipation walls and the mold frame is in tight engagement with the second heat dissipation wall.

12 Claims, 2 Drawing Sheets

BACKLIGHT MODULE AND DISPLAY DEVICE

CROSS REFERENCE TO RELATED APPLICATIONS

This application claims the priority of Chinese Patent Application No. 201410817836.0, entitled "Backlight Module and Display Device", filed on Dec. 24, 2014, the disclosure of which is incorporated herein by reference in its entirety.

BACKGROUND OF THE INVENTION

1. Field of the Invention

The present invention relates to the field of liquid crystal displaying technology, and in particular to a backlight module and a display device.

2. The Related Arts

Currently, liquid crystal display devices have been widely used in various electronic products to serve as display components of electronic devices. Following the trend that electronic products get light and thin, bezels of electronic devices have been made increasingly slim. A backlight module is an important component of the liquid crystal display device and the requirement for brightness is getting severe, and thus, light incidence efficiency of a light bar of the backlight module must suit the need of being increasingly high.

However, with the brightness of the liquid crystal module getting higher and higher, the operation efficiency of an electronic component must be faster and faster, resulting in an enlarged amount of heat generated thereby. If not timely dissipated, the heat would severely lower down the brightness of the module and the efficiency of the electronic component.

SUMMARY OF THE INVENTION

The technical solution to be addressed in the present invention is to provide a backlight module, which allows heat of the backlight module and a display device electronic component to be timely dissipated.

The present invention also provides a display device.

To achieve the above object, embodiments of the present invention provide the following technical solutions:

The present invention provides a backlight module, which comprises a mold frame, a light guide plate, a light bar light source, and an optic film, the light guide plate, the light source, and the optic film being disposed in the mold frame, the light source being arranged between a light incidence side of the light guide plate and the mold frame, the optic film and the light guide plate being arranged to stack on each other, the backlight module further comprising a heat dissipation frame, the heat dissipation frame comprising a first heat dissipation wall, a second heat dissipation wall, and a third heat dissipation wall that is opposite to the first heat dissipation wall, the second heat dissipation wall being connected to the first heat dissipation wall and the third heat dissipation wall, an end of the mold frame at which the light source is arranged being received between the first heat dissipation wall and the third heat dissipation wall in such a way that the mold frame is in tight engagement with the second heat dissipation wall.

In the above backlight module, the light source comprises a light source circuit board, the light source circuit board and the mold frame being fixed together by a double-sided adhesive tape.

In the above backlight module, the first heat dissipation wall is fixed to the mold frame and the light source circuit board by the double-sided adhesive tape and the double-sided adhesive tape extends to an edge portion of a surface of the optic film.

In the above backlight module, the third heat dissipation wall is located at an end of the light source that is distant from the first heat dissipation wall and supports the mold frame and the light incidence side of the light guide plate.

In the above backlight module, a reflector plate is included between the light guide plate and the third heat dissipation wall.

In the above backlight module, the double-sided adhesive tape is made of a thermally conductive material.

The present invention also provides a display device. The display device comprises a backlight module and a liquid crystal panel, the backlight module comprising a mold frame, a light guide plate, a light bar light source, and an optic film, the light guide plate, the light source, and the optic film being disposed in the mold frame, the light source being arranged between a light incidence side of the light guide plate and the mold frame, the optic film and the light guide plate being arranged to stack on each other, the backlight module further comprising a heat dissipation frame, the heat dissipation frame comprising a first heat dissipation wall, a second heat dissipation wall, and a third heat dissipation wall that is opposite to the first heat dissipation wall, the second heat dissipation wall being connected to the first heat dissipation wall and the third heat dissipation wall, an end of the mold frame at which the light source is arranged being received between the first heat dissipation wall and the third heat dissipation wall in such a way that the mold frame is in tight engagement with the second heat dissipation wall; and the liquid crystal panel is disposed on the backlight module and the liquid crystal panel is fixed to the first heat dissipation wall and the optic film.

In the above display device, the light source and the mold frame are positioned with respect to each other by means of a light source circuit board. The first heat dissipation wall is fixed to the mold frame and the light source circuit board by a double-sided adhesive tape, the double-sided adhesive tape extending to an edge portion of a surface of the optic film.

In the above display device, the liquid crystal panel comprises a lower polarizer, a first glass layer, a second glass layer, and an upper polarizer, the lower polarizer, the first glass layer, the second glass layer, and the upper polarizer being sequentially stacked, the first glass layer being located on the lower polarizer, the lower polarizer and the optic film being fixed to each other by the double-sided adhesive tape that extends to the optic film.

In the above display device, the display device further comprises a flexible circuit board and a chip, the first glass layer comprising an extension section, the flexible circuit board and the chip being mounted on the extension section, the extension section being disposed on the first heat dissipation wall of the heat dissipation frame.

In the above display device, the light source comprises a light source circuit board, the light source circuit board and the mold frame being fixed together by a double-sided adhesive tape.

In the above display device, the first heat dissipation wall is fixed to the mold frame and the light source circuit board by the double-sided adhesive tape and the double-sided adhesive tape extends to an edge portion of a surface of the optic film.

In the above display device, the third heat dissipation wall is located at an end of the light source that is distant from the first heat dissipation wall and supports the mold frame and the light incidence side of the light guide plate.

In the above display device, a reflector plate is included between the light guide plate and the third heat dissipation wall.

1 In the above display device, the double-sided adhesive tape is made of a thermally conductive material.

The display device of the present invention comprises a flexible circuit board and a chip that are mounted above a heat dissipation frame of a backlight module so as to timely remove excessive heat from the flexible circuit board and the chip and the light source to thereby reduce the operation temperatures of the electronic components and the light source and prevent the brightness of the backlight module and efficiency of the electronic components from being affected by high temperature.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution proposed in an embodiment of the present invention with reference to the attached drawings of the embodiment of the present invention.

Figure 1:
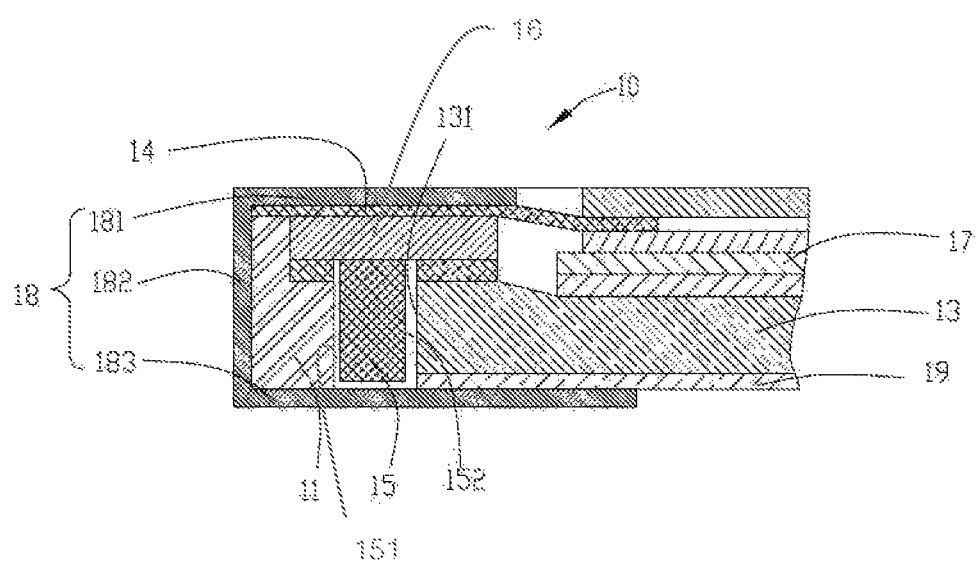
FIG. 1 is a cross-sectional view showing a backlight module according to a preferred embodiment provided by the present invention.

Referring to FIG. 1, a preferred embodiment of the present invention provides a backlight module 10, which comprises a mold frame 11, a light guide plate 13, a light source 15, and an optic film 17. The light guide plate 13, the light source 15, and the optic film 17 are disposed in the mold frame 11. The light source 15 is arranged between a light incidence side of the light guide plate 13 and the mold frame 11. The optic film 17 and the light guide plate 13 are arranged to stack on each other. The backlight module further comprises a heat dissipation frame 18. The heat dissipation frame 18 comprises a first heat dissipation wall 181, a second heat dissipation wall 182 and a third heat dissipation wall 183 that is opposite to the first heat dissipation wall 181. The second heat dissipation wall 182 is connected to the first heat dissipation wall 181 and the third heat dissipation wall 183. An end of the mold frame 11 at which the light source 15 is arranged is received between the first heat dissipation wall 181 and the third heat dissipation wall 183 in such a way that the mold frame 11 is in tight engagement with the second heat dissipation wall 182.

In the instant embodiment, the mold frame 11 is a rectangular frame. The light guide plate 13 is a rectangular plate and comprises a light incidence side 131. The light source 15 comprises a lighting-opposite surface 151, a light emission surface 152 that is opposite to the lighting-opposite surface, and a light source circuit board 16. The light guide plate 13 is a rectangular plate. The light guide plate 13 and the light source 15 are received in the mold frame 11 in such a way that the light emission surface 152 faces the light incidence side 131 of the light guide plate 13.

In the instant embodiment, the mold frame 11 is positioned with respect to the light source circuit board 16 of the light source 15 by a double-sided adhesive tape. Specifically, the light source circuit board 16 is fixed by the double-sided adhesive tape to an inside surface of the mold frame 11 and an edge portion of the light guide plate 13 so as to position and the light source 15 on the mold frame 11.

In the instant embodiment, the first heat dissipation wall 181 is fixed by a double-sided adhesive tape 14 to mold frame 11 and the light source circuit board 16 and the double-sided adhesive tape 14 extends to an edge portion of a surface of the optic film 17. The double-sided adhesive tape 14 is made of a thermally conductive material in order to facilitate heat transfer of the heat dissipation frame 18 and to prevent detachment of the double-sided adhesive tape 14. The optic film 17 can be formed through stacking of various films, such as diffuser plates, prism plates, and polarizers. The extension of the double-sided adhesive tape 14 is adhesively attached to the edge portion of the surface of the optic film 17 that is distant from the light guide plate 13 for fixing the optic film 17 to the mold frame 11.

In the instant embodiment, the third heat dissipation wall 183 is located at an end of the light source 15 that is distant from the first heat dissipation wall 181 and supports the mold frame 11 and the light incidence side of the light guide plate 13. A reflector plate 19 is further included between the light guide plate 13 and the third heat dissipation wall 183.

The backlight module 10 of the present invention comprises the heat dissipation frame 18, which is arranged to surround the light source 15 to reduce the heat generated by the light source 15 so as to prevent an excessively high temperature from affecting the quality of the backlight module 10.

Figure 2:
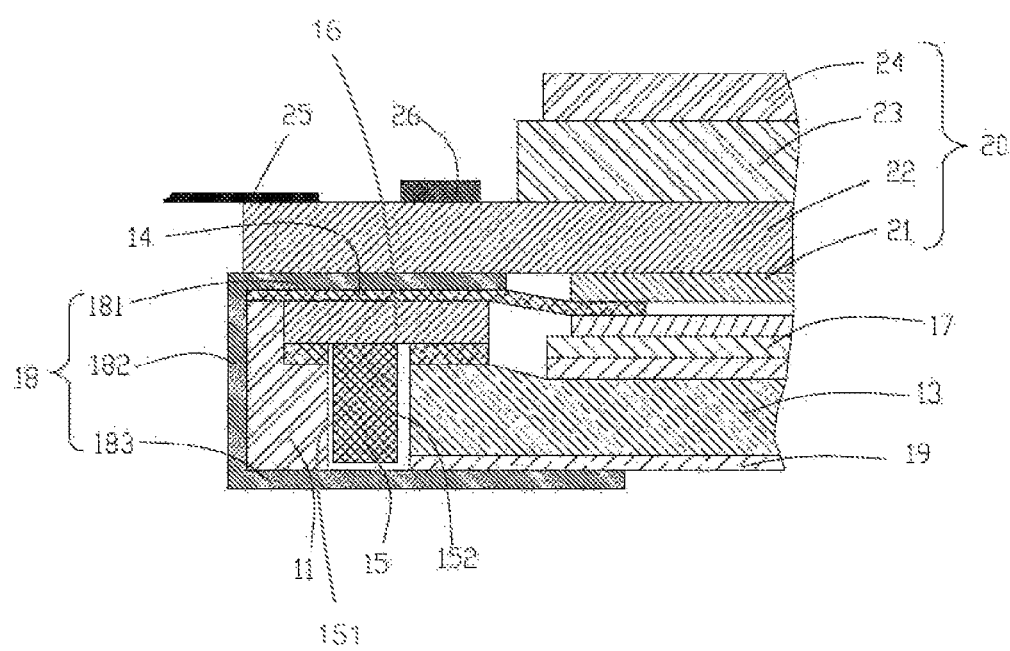
FIG. 2 is a cross-sectional view showing a display device including a backlight module according to the present invention.

Referring to FIG. 2, the present invention also provides a display device. The display device comprises the backlight module 10 and a liquid crystal panel 20. The liquid crystal panel 20 is fixed to the first heat dissipation wall 181 and the optic film 17.

In the instant embodiment, the liquid crystal panel 20 comprises a lower polarizer 21, a first glass layer 22, a second glass layer 23, and an upper polarizer 24. The lower polarizer 21, the first glass layer 22, the second glass layer 23, and the upper polarizer 24 are sequentially stacked and the first glass layer 22 is located on the lower polarizer 21. The lower polarizer 21 and the optic film 17 are fixed to each other by the double-sided adhesive tape 14 that extends to the optic film 17.

In the instant embodiment, the display device further comprises a flexible circuit board 25 and a chip 26. The first glass layer 22 comprises an extension section 221 and the flexible circuit board 25 and the chip 26 are mounted on the extension section 221. The extension section 221 is disposed on the first heat dissipation wall 181 of the heat dissipation frame 18.

The display device of the present invention comprises a flexible circuit board 25 and a chip 26 that are mounted above a heat dissipation frame of a backlight module 10 and the heat dissipation frame 18 surrounds heat generating components, such as a light source and electronic components, so as to effectively and timely remove excessive heat from electronic components, such as the flexible circuit board 25 and the chip 26, and the light source to thereby reduce the operation temperatures of the electronic components and the light source and prevent the brightness of the backlight module and efficiency of the electronic components from being affected by high temperature.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A backlight module, comprising a mold frame, a light guide plate, a light bar light source, and an optic film, the light guide plate, the light source, and the optic film being disposed in the mold frame, the light source being arranged between a light incidence side of the light guide plate and the mold frame, the optic film and the light guide plate being arranged to stack on each other, wherein the backlight module further comprises a heat dissipation frame, the heat dissipation frame comprising a first heat dissipation wall, a second heat dissipation wall, and a third heat dissipation wall that is opposite to the first heat dissipation wall, the second heat dissipation wall being connected to the first heat dissipation wall and the third heat dissipation wall, an end of the mold frame at which the light source is arranged being received between the first heat dissipation wall and the third heat dissipation wall in such a way that the mold frame is in tight engagement with the second heat dissipation wall;
   wherein the light source comprises a light source circuit board, the light source circuit board and the mold frame being fixed together by a double-sided adhesive tape; and
   wherein the first heat dissipation wall is fixed to the mold frame and the light source circuit board by the double-sided adhesive tape and the double-sided adhesive tape extends to an edge portion of a surface of the optic film.

2. The backlight module as claimed in claim 1, wherein the third heat dissipation wall is located at an end of the light source that is distant from the first heat dissipation wall and supports the mold frame and the light incidence side of the light guide plate.

3. The backlight module as claimed in claim 2, wherein a reflector plate is included between the light guide plate and the third heat dissipation wall.

4. The backlight module as claimed in claim 1, wherein the double-sided adhesive tape is made of a thermally conductive material.

5. A display device, comprising a backlight module and a liquid crystal panel, the backlight module comprising a mold frame, a light guide plate, a light bar light source, and an optic film, the light guide plate, the light source, and the optic film being disposed in the mold frame, the light source being arranged between a light incidence side of the light guide plate and the mold frame, the optic film and the light guide plate being arranged to stack on each other, wherein the backlight module further comprises a heat dissipation frame, the heat dissipation frame comprising a first heat dissipation wall, a second heat dissipation wall, and a third heat dissipation wall that is opposite to the first heat dissipation wall, the second heat dissipation wall being connected to the first heat dissipation wall and the third heat dissipation wall, an end of the mold frame at which the light source is arranged being received between the first heat dissipation wall and the third heat dissipation wall in such a way that the mold frame is in tight engagement with the second heat dissipation wall; and the liquid crystal panel is disposed on the backlight module and the liquid crystal panel is fixed to the first heat dissipation wall and the optic film;
   wherein the light source comprises a light source circuit board, the light source circuit board and the mold frame being fixed together by a double-sided adhesive tape, the first heat dissipation wall being fixed to the mold frame and the light source circuit board by the double-sided adhesive tape, the double-sided adhesive tape extending to an edge portion of a surface of the optic film.

6. The display device as claimed in claim 5, wherein the liquid crystal panel comprises a lower polarizer, a first glass layer, a second glass layer, and an upper polarizer, the lower polarizer, the first glass layer, the second glass layer, and the upper polarizer being sequentially stacked, the first glass layer being located on the lower polarizer, the lower polarizer and the optic film being fixed to each other by the double-sided adhesive tape that extends to the optic film.

7. The display device as claimed in claim 6, wherein the display device further comprises a flexible circuit board and a chip, the first glass layer comprising an extension section, the flexible circuit board and the chip being mounted on the extension section, the extension section being disposed on the first heat dissipation wall of the heat dissipation frame.

8. The display device as claimed in claim 6, wherein the light source comprises a light source circuit board, the light source circuit board and the mold frame being fixed together by a double-sided adhesive tape.

9. The display device as claimed in claim 8, wherein the first heat dissipation wall is fixed to the mold frame and the light source circuit board by the double-sided adhesive tape and the double-sided adhesive tape extends to an edge portion of a surface of the optic film.

10. The display device as claimed in claim 9, wherein the third heat dissipation wall is located at an end of the light source that is distant from the first heat dissipation wall and supports the mold frame and the light incidence side of the light guide plate.

11. The display device as claimed in claim 10, wherein a reflector plate is included between the light guide plate and the third heat dissipation wall.

12. The display device as claimed in claim 11, wherein the double-sided adhesive tape is made of a thermally conductive material.

* * * * *